United States Patent
Sedarat et al.

(10) Patent No.: US 7,177,419 B2
(45) Date of Patent: Feb. 13, 2007

(54) METHODS AND APPARATUSES FOR DETECTING AND REDUCING NON-LINEAR ECHO IN A MULTI-CARRIER COMMUNICATION SYSTEM

(75) Inventors: Hossein Sedarat, San Jose, CA (US); Kevin Dean Fisher, Palo Alto, CA (US)

(73) Assignee: 2Wire, Inc., San Jose, CA (US)

( * ) Notice: Subject to any disclaimer, the term of this patent is extended or adjusted under 35 U.S.C. 154(b) by 44 days.

(21) Appl. No.: 10/948,406

(22) Filed: Sep. 22, 2004

(65) Prior Publication Data

US 2006/0062379 A1    Mar. 23, 2006

(51) Int. Cl.
*H04M 9/08* (2006.01)
(52) U.S. Cl. ............... 379/406.1; 379/406.09; 379/406.13
(58) Field of Classification Search ........... 379/406.01–406.16; 370/286–292
See application file for complete search history.

(56) References Cited

U.S. PATENT DOCUMENTS

| | | | | |
|---|---|---|---|---|
| 4,977,591 A | * | 12/1990 | Chen et al. ............. | 379/406.1 |
| 5,596,439 A | * | 1/1997 | Dankberg et al. ........... | 398/35 |
| 5,844,940 A | * | 12/1998 | Goodson et al. ............ | 375/222 |
| 6,597,732 B1 | * | 7/2003 | Dowling ..................... | 375/222 |
| 6,731,914 B2 | * | 5/2004 | Creigh et al. ............ | 455/115.1 |
| 2003/0108094 A1 | * | 6/2003 | Lai et al. .................... | 375/222 |
| 2003/0206579 A1 | * | 11/2003 | Bryant ....................... | 375/219 |
| 2004/0087278 A1 | * | 5/2004 | Lin et al. ..................... | 455/73 |
| 2005/0041753 A1 | * | 2/2005 | Cunningham ............... | 375/285 |
| 2005/0276355 A1 | * | 12/2005 | Chow et al. ................ | 375/340 |

* cited by examiner

*Primary Examiner*—Fan Tsang
*Assistant Examiner*—Ramnandan Singh
(74) *Attorney, Agent, or Firm*—Blakely, Sokoloff, Taylor & Zafman LLP

(57) ABSTRACT

Apparatuses, systems, and methods for a multi-carrier communication system that detects and reduces an echo from a non-linear element present on the transmission medium. In an embodiment, a training period is established between a first transmitter-receiver device and a second transmitter-receiver device in the discrete multiple tone system that separates communication signals into two or more separate frequency bands. Noise caused by an echo generated by a non-linear element present on the transmission medium is detected during the training period. The significance of the non-linear echo contribution to the overall ambient noise level present in the system may be determined.

21 Claims, 6 Drawing Sheets

METHODS AND APPARATUSES FOR DETECTING AND REDUCING NON-LINEAR ECHO IN A MULTI-CARRIER COMMUNICATION SYSTEM

TECHNICAL FIELD

Embodiments of the present invention pertain to the field of communication systems and, more particularly, to multi-carrier communication systems.

BACKGROUND

A multi-carrier communication system, such as a Discrete Multiple-Tone (DMT) system in the various types of Digital Subscriber Line (e.g. ADSL and VDSL) systems, carries information from a transmitter to a receiver over a number of tones. Each tone may be a group of one or more frequencies defined by a center frequency and a set bandwidth. The tones are also commonly referred to as sub-carriers or sub-channels. Each tone acts as a separate communication channel to carry information between a local transmitter-receiver device and a remote transmitter-receiver device.

DMT communication systems use a modulation method in which the available bandwidth of a communication loop, such as twisted-pair copper media, is divided into these numerous sub-channels. A communication loop may also be known as a communication channel. However, to avoid confusion, the term channel is used herein in reference to tones and frequencies, rather than transmission medium. The term communication loop is understood to refer generally to a physical transmission medium, including copper, optical fiber, and so forth, as well as communication signal paths, including radio frequency (RF) and other physical or non-physical communication signal paths.

There are various sources of interference and noise in a multi-carrier communication system. Interference and noise may corrupt the data-bearing signal on each tone as the signal travels through the communication loop and is decoded at the receiver. The transmitted data-bearing signal may be decoded erroneously by the receiver because of this signal corruption.

In order to account for potential interference on the transmission line and to guarantee a reliable communication between the transmitter and receiver, each tone can merely carry a limited number of data bits per unit time. This number is related to a bit error rate (BER) for a given tone. The number of data bits or the amount of information that a tone carries may vary from tone to tone and depends on the relative power of the data-bearing signal compared to the power of the corrupting signal on that particular tone. The number of bits that a specific tone may carry decreases as the relative strength of the corrupting signal increases.

Many communication systems are designed to operate in a duplex mode. In this mode, a single transmission medium is used for both receive and transmission of data. For instance, in DSL systems, a single pair of twisted wires is used to carry information in both directions. In such cases, the modem has to separate the effects of its own transmit signal from the incoming signal received from the line. Typically, a near end signal and a far end signal are separated to create an upstream signal and a downstream signal. The near end signal refers to the signal send by the local transmitter. The far end signal refers to the signal sent by a remote transmitter. If the seperation is not done properly, the near-end transmit signal manifests as a transmission echo corrupting the received far-end signal. The corrupting echo should be minimized in order to achieve the best data rate.

SUMMARY

Embodiments of an apparatus, system, and method are described for a multi-carrier communication that detects an echo from a non-linear element present on the transmission medium. In an embodiment, a training period is established between a first transmitter-receiver device and a second transmitter-receiver device in the discrete multiple tone system that separates communication signals into two or more separate frequency bands. Noise caused by an echo generated by the non-linear elements present on the transmission medium is detected during the training period. The significance of the echo contribution to the overall ambient noise level present in the system may be determined. The echo generated by the non-linear elements may be eliminated.

Other features and advantages of the present invention will be apparent from the accompanying drawings and the detailed description that follows.

BRIEF DESCRIPTION OF THE DRAWINGS

Embodiments of the present invention are illustrated by way of example and are not intended to be limited by the figures of the accompanying drawings, in which.

DETAILED DESCRIPTION

In the following detailed description, numerous specific details are set forth in order to provide a thorough understanding of the invention. However, it will be understood by those skilled in the art that certain embodiments of the present invention may be practiced without these specific details. In other instances, well-known methods, procedures, components, and circuits have not been described in detail so as not to obscure the presented embodiments of the invention. The following detailed description includes several modules, which will be described below. These modules may be implemented by hardware components, such as logic, or may be embodied in machine-executable instructions, which may be used to cause a general-purpose or special-purpose processor programmed with the instructions to perform the operations described herein. Alternatively, the operations may be performed by a combination of hardware and software.

Apparatuses, systems, and methods for a multi-carrier communication system that detects one or more echos from a non-linear noise source. In an embodiment, a training period is established between a first transmitter-receiver device 102 and a second transmitter-receiver device 104 in the discrete multiple tone system that separates communication signals into two or more separate frequency bands. Noise caused by the echo generated by the non-linear elements present on the transmission medium, such as a telephone line, is detected during the training period. The significance of the non-linear echo contribution to the overall ambient noise level present in the system may be determined. If significant, the non-linear echo may be reduced or eliminated by 1) placing an isolating filter in between the non-linear element and the transmission medium, 2) reducing transmit power of the transmitter-receiver device that is generating the echo, or 3) another similar technique.

Figure 1:
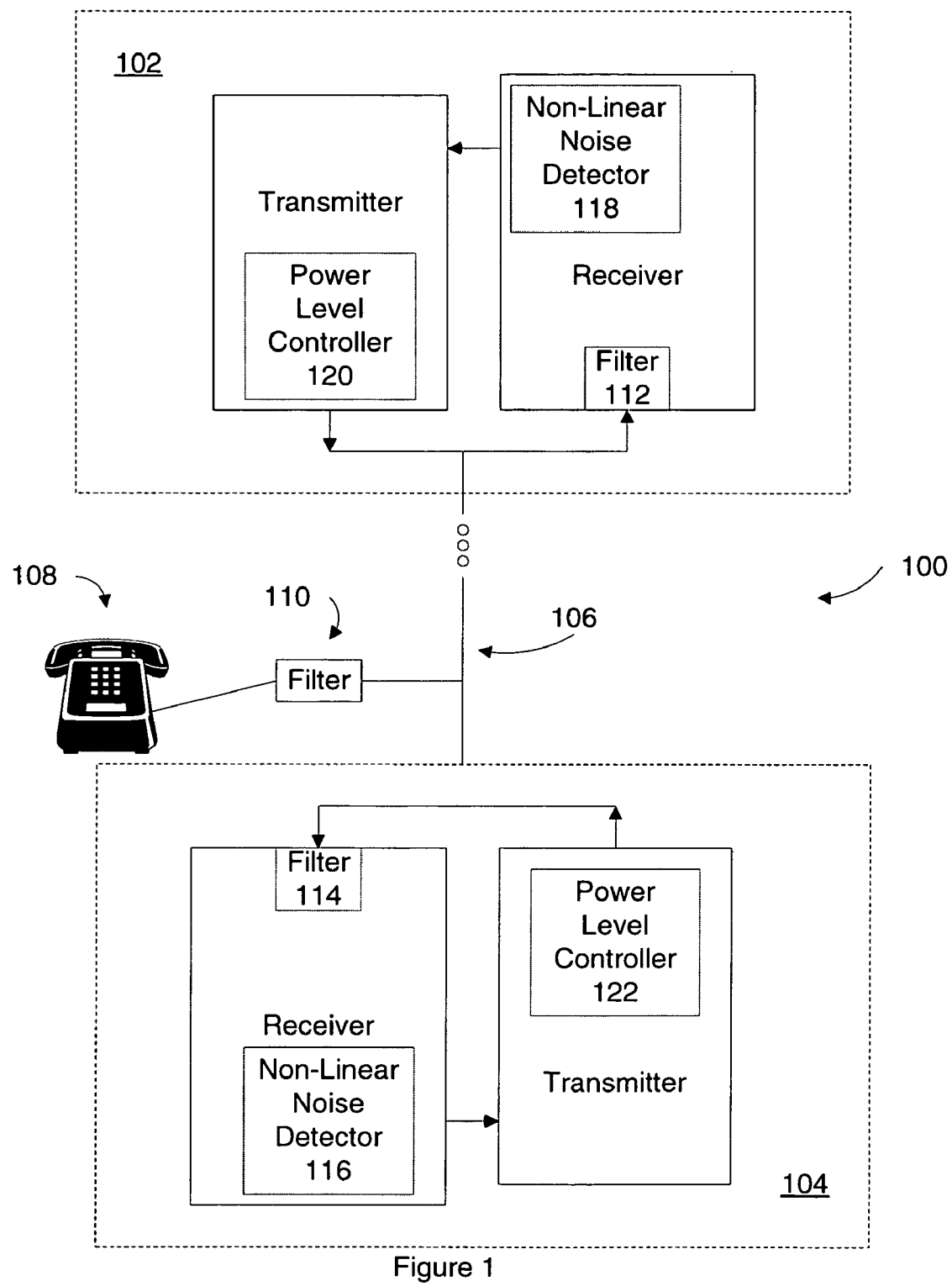
FIG. 1 illustrates a block diagram of an embodiment of a discrete multiple tone system that detects and reduces or eliminates an echo generated by one or more non-linear elements present on the transmission medium.

FIG. 1 illustrates a block diagram of an embodiment of a discrete multiple tone system that detects and eliminates an echo generated by non-linear elements present on the transmission medium. The discrete multiple tone system 100, such as a Digital Subscriber Line (DSL) based network, may have two or more transmitter-receiver devices 102, 104, such as a set top box. The first transmitter-receiver device 102 transmits and receives communication signals from the second transmitter-receiver device 104 over a transmission medium 106, such as a telephone line. Other devices such as telephones 108 may also connect to this transmission medium 106. An isolating filter 110 generally exists between the telephone and the transmission medium 106. A training period occurs when initially establishing communications between the first transmitter-receiver device 102 and a second transmitter-receiver device 104.

The discrete multiple tone system 100 may include a central office, multiple distribution points, and multiple end users. The central office may contain the first transmitter-receiver device 102, such as a modem, that communicates with the second transmitter-receiver device 104 at an end user's location.

Each receiver portion of the transmitter-receiver device may contain high or low frequency passband filter 112, 114. If the transmitter portion of that transmitter-receiver device transmits a high frequency data signal, then the receiver will contain a low frequency passband filter in order to be able to receive the low frequency data signals from the other transmitter-receiver device. Each receiver portion of the transmitter-receiver device may also contain a non-linear echo detector 116, 118. Each non linear echo detector 116, 118 may contain software and/or logic programmed to detect for the presence of the echo from the non-linear source as well as software and/or logic programmed to compare the significance of the non-linear echo contribution to the overall ambient noise level present in the system.

Each transmitter portion of the transmitter-receiver device may contain transmit power level controller 120, 122. Each transmit power level controller 120, 122 may contain software or logic programmed to compensate for the presence of the non-linear echo by decreasing the maximum transmission power by a preset value to place the entire range of the transmit power level into the linear portion of the input/output operating characteristics of the transmitter-receiver device.

The non-linear echo detector may cooperate with the transmit power level controller 1) to distinguish the background noise from a non-linear echo, 2) to measure the significance of the non-linear echo, and 3) to reduce and/or prevent the non-linear echo. For example, the first non-linear noise detector 116 cooperates with the first transmit power level controller 122.

Figure 2:
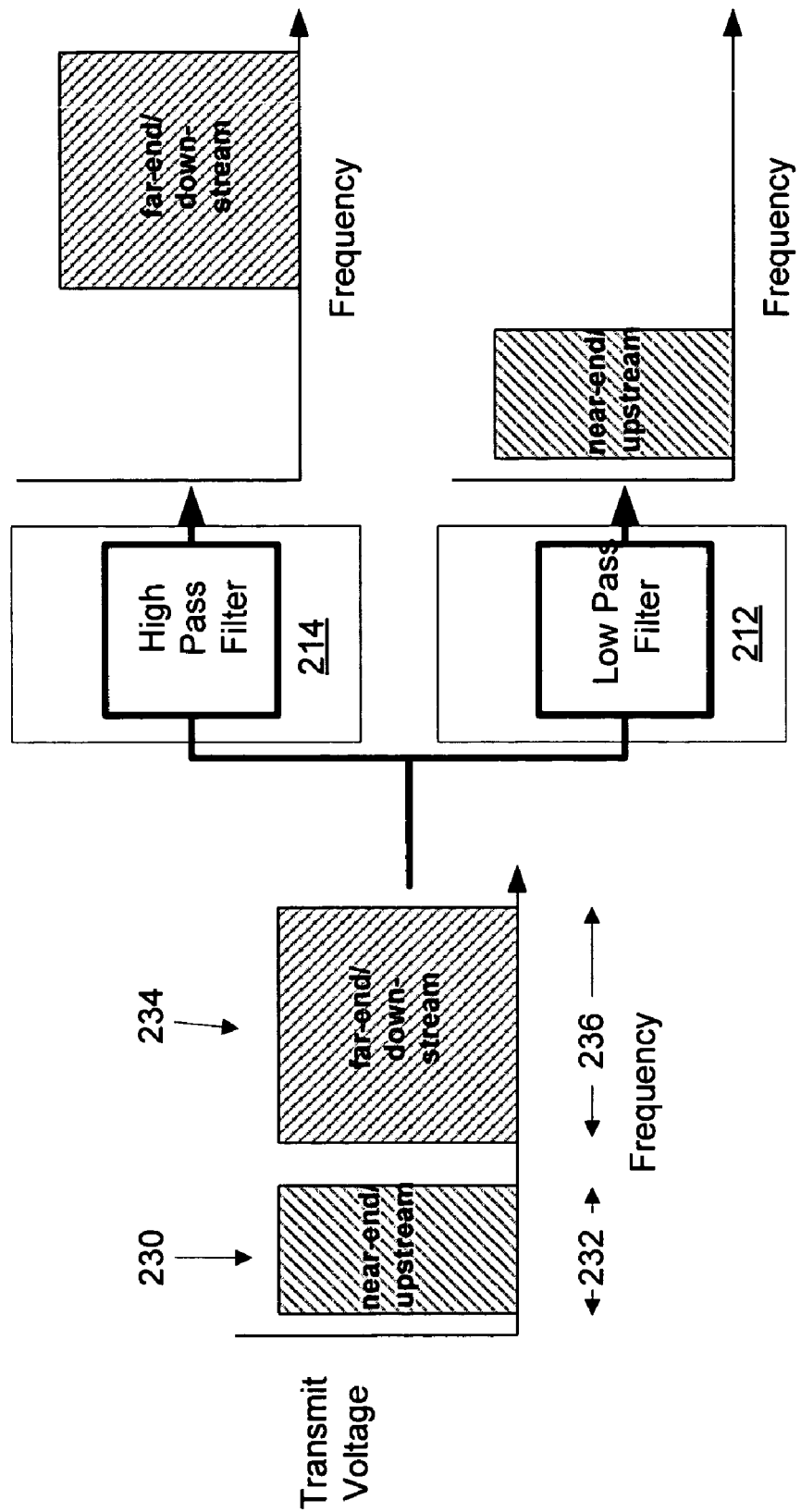
FIG. 2 illustrates a simplified signal diagram of an embodiment of the discrete multiple tone system operating in a duplex mode by separating the upstream and down stream communication signals into two or more separate frequency bands via frequency-division multiplexing (FDM).

FIG. 2 illustrates a simplified signal diagram of an embodiment of the discrete multi-tone system operating in a duplex mode by separating the upstream and down stream communication signals into two or more separate frequency bands, i.e., far-end and near-end signals, via frequency-division multiplexing (FDM). The near end signal 230 transmitted by the local transmitter-receiver device, such as the first transmitter-receiver device, may occupy a first bandwidth 232 near the bottom end of the frequency spectrum. The far end signal 234 transmitted by the remote transmitter-receiver device may occupy a second bandwidth 236 near the top end of the frequency spectrum. Note, in an embodiment, the far end signal transmitted by the remote transmitter-receiver device may occupy a second bandwidth near the bottom end of the frequency spectrum and the near end signal occupies a first bandwidth near the top end of the frequency spectrum. Thus, each transmitter-receiver device may contain a frequency bandpass filter 212, 214 in its receiver input path to receive the far end signal and filter out linear cross talk noise from the near end signal.

Thus, frequency-division multiplexing may be employed to frequency separate the far-end and near-end signals. In this method different frequency bands are assigned to far-end and near-end signals. In such case, a proper filtering of the line signal can separate the two signals.

For example, the first transmitter-receiver device may contain a low pass filter 212 in its receiver input path to receive the upstream signal 230 and filter out linear cross talk noise from the downstream signal 234. Similarly, the second transmitter-receiver device may contain a high pass filter 214 in its receiver input path to receive the downstream signal 234 and filter out linear cross talk noise from the upstream signal 230.

Frequency-division multiplexing provides a good separation of near-end signals 230 and far-end signals 234 as long as there are no non-linear effects in the signal path. Non-linear noise generally causes an upstream and/or downstream signal to have a wider frequency bandwidth. Therefore, the far-end and near-end signals may mix in frequency and it is not possible to separate them using a filtering operation.

Figure 3:
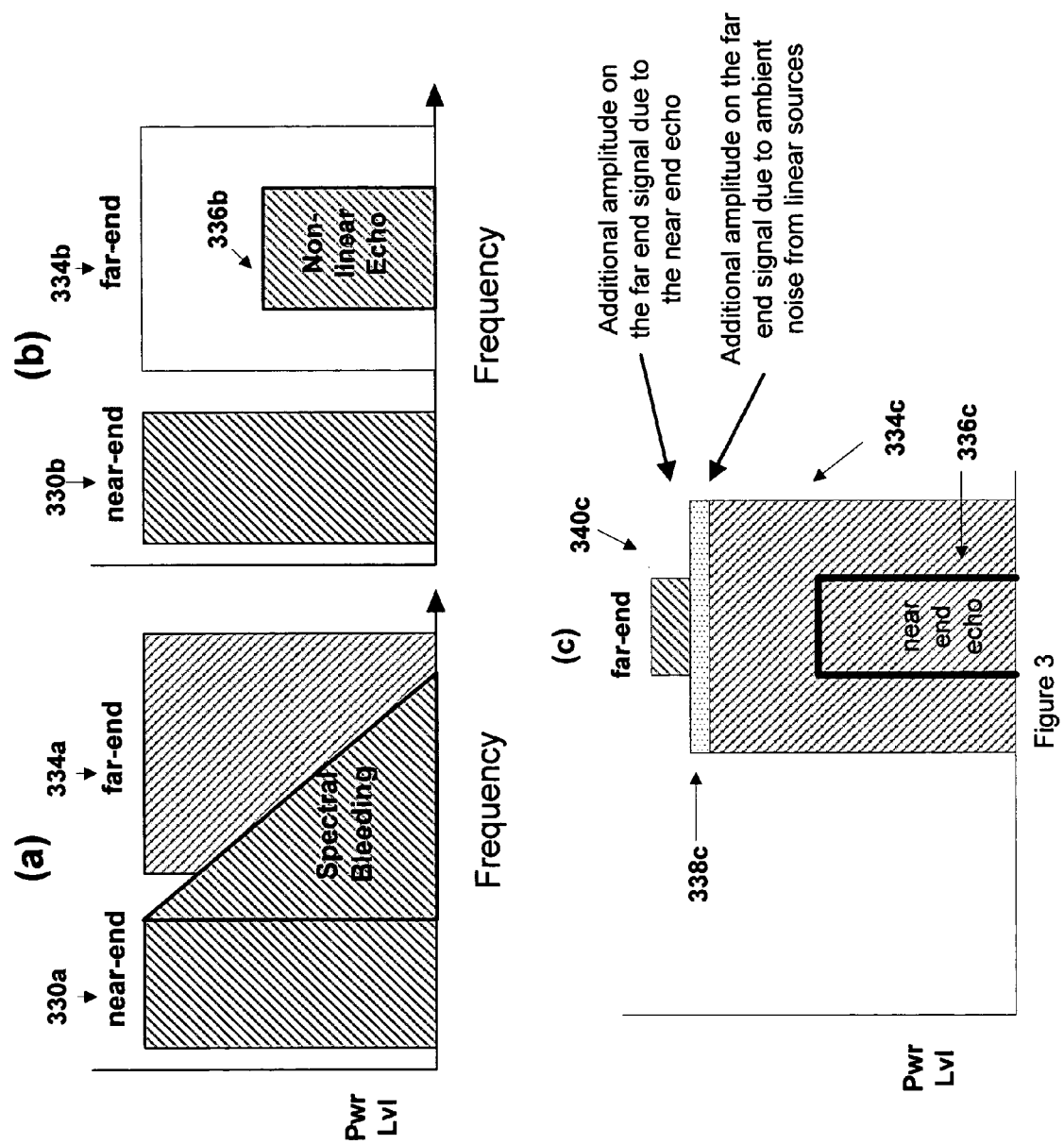
FIGS. 3a–3c illustrate simplified signal diagrams of embodiments of the far-end and near-end signals mixing in frequency due to the echo generated by various non-linear elements.

FIGS. 3a–3c illustrate simplified signal diagrams of embodiments of the far-end and near-end signals mixing in frequency due to non-linear elements in the transmit signal path.

FIG. 3a illustrates a simplified signal diagram of an embodiment of the far-end and near-end signals mixing in frequency due to echo. One source of echo is due to the inherent windowing operation for frame processing in a multi-carrier system. This type of echo causes some spectral bleeding of the transmit signal into other frequency band assigned to the receive signal. The far-end signals 334a and near-end signals 330a mix in frequency and it is not possible to separate them using a simple filter. Various noise cancellers implemented in time and/or frequency domain may correct this type of echo. Further, transmitting a periodic signal may eliminate this type of noise.

FIG. 3b illustrates a simplified signal diagram of an embodiment of the echo of the near end signal generated by a non-linear element in the signal path appearing as a harmonic of the near end signal in the frequency band reserved for the far end signal. The training protocol may direct that only one of the transmitter receivers will be transmitting a signal at this time. Thus, intervals exists were one side of the transmitter-receiver connection transmit periodic signals while the other end is silent during the initial training period of the discrete multiple tone system. The training protocol may direct that no signal should be present in that far end frequency band 334b at that point in the training period. However, a harmonic echo of the near end signal 336b generated by the non-linear elements may be present in the frequency band reserved for the far end signal 334b when no signal should be present in the second frequency band.

The echo of the near end signal 336b may be a transmit harmonic due to saturation and clipping of the near-end signal 330b. The clipping and saturation that cause the strong echo signal 330b may be generated by the power level of the local transmitter being set to high. This type of non-linearity generates strong harmonics of the line signal, which can corrupt the received signal and reduce the performance significantly.

Referring to FIG. 1, another potential source of non-linear echo is due to the presence of a non-linear element being directly connected to the transmission medium 106, such as a phone line, rather then coupling through an impedance matching filter 110 to the transmission medium 106. The non-linear device 108 being directly connected to the transmission medium 106 may cause echos due to saturation and clipping to appear on the transmission medium 106.

FIG. 3c illustrates a simplified signal diagram of an embodiment of the echo of the near end signal generated by a non-linear element appearing as a harmonic of the near end signal in the frequency band reserved for the far end signal. The training protocol may direct that both of the transmitter receivers will be transmitting a signal at this time. The training protocol may direct that a signal of a known bandwidth and amplitude should be present in that far end frequency band 330c at that point in the training period. However, a harmonic echo from the other frequency band 336c, such as the near end signal, generated by the non-linear element may be also be present in the frequency band reserved for the far end signal. Both the ambient noise 338c and the harmonic echo 336c will add to the power of the far end signal 334c present in the frequency band reserved for the far end signal to generate a total amount of power 340c measured for the signal present in that frequency band.

Referring to FIG. 1, each transmitter-receiver device 102, 104 may have a non-linear echo detector 116, 118 to detect a non-linear echo due to saturation and clipping. In an embodiment, the non-linear echo detector 116, 118 detects the non-linear echo due to saturation and clipping when spectral bleeding is prevented. During the initial training period, the transmitter-receiver devices can prevent spectral bleeding by choosing test signals that are periodic. The windowing operation on the periodic signal does not cause echo due to spectral bleeding.

The detection of a non-linear echo may occur in either 1) a period when one of the transmitter-receivers is supposed to be silent, i.e. not transmitting, and/or 2) when both of the transmitter-receivers are transmitting.

Each transmitter-receiver device 102, 104 may generate a training signal to create a similar probability of saturation as during data transmission. The periodic training signal should have a frequency bandwidth, power and peak-to-average ratio similar to the data signals used during data transmission. In ADSL and VDSL systems, this signal may be called a Reverb signal.

Referring to FIG. 3c, saturation of a transmitted signal may be detected if the out-of-band power of a Reverb transmission is greater than the background noise level. Thus, if the total power of the received signal 340c is greater than the known power level of the training signal 334c plus the background noise 338c, then an echo 336c generated by saturation may be present in the received training signal. The transmitter-receiver device may communicate the saturation condition back to its transmitting power level controller block. The power level controller block reduces the transmission power until the out-of-band power is negligible to eliminate the saturation condition. The reduction of power can be done uniformly through the entire transmit bandwidth or can be done selectively over a smaller band.

Figure 4:
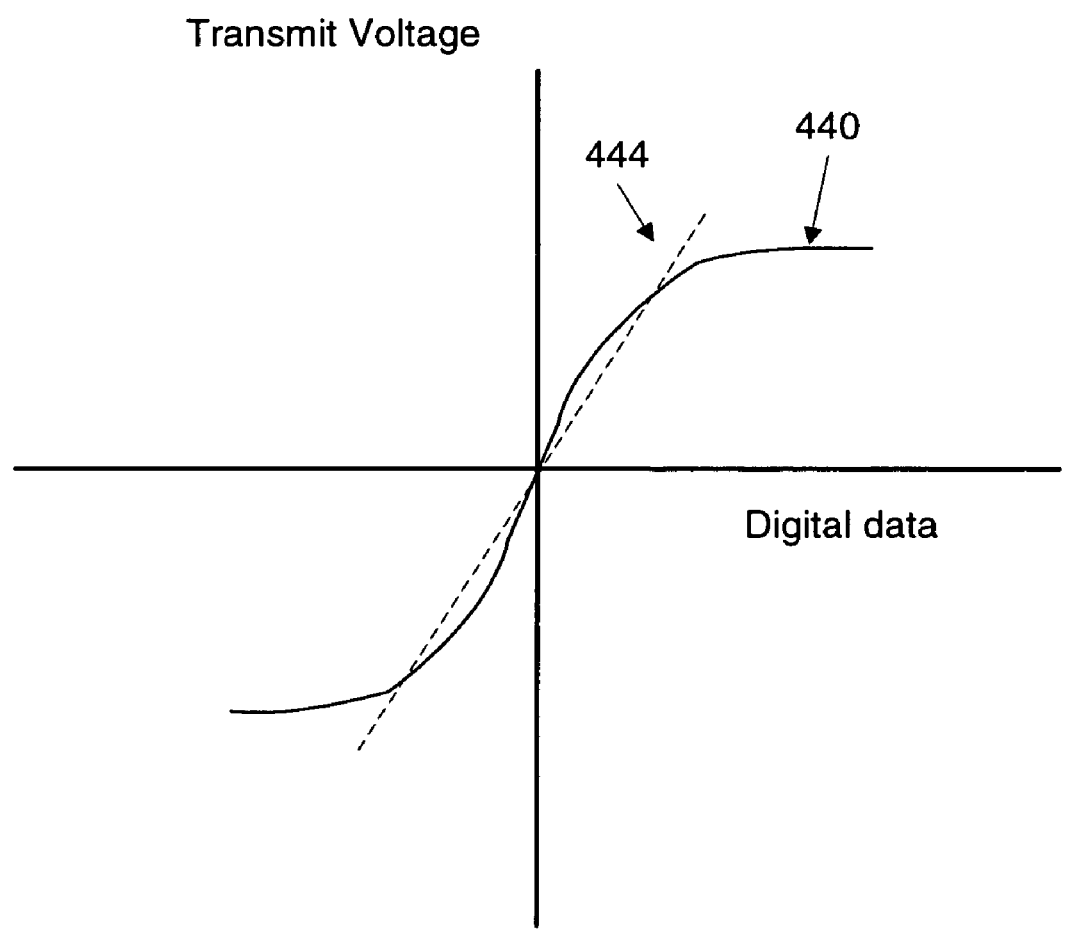
FIG. 4 illustrates an example graph of encoded digital data to corresponding transmission power level for an embodiment of a transmitter receiver device.

FIG. 4 illustrates an example graph of encoded digital data to corresponding transmission power level for an embodiment of a transmitter receiver device. Horizontally as the horizontal digital data value increases the corresponding vertical transmission power level increases. The solid line indicates actual transmitted power level 440 of the periodic training signal. The dashed line indicates the ideal linear power level 442 of the periodic training signal. The transmitter section of the transmitter-receiver has a relatively linear region of transmit power 440 indicated by the solid line in the region that corresponds to the dashed line. The solid transmit power level 440 between the ends of the dash linear region has a relatively linear correlation between the desired transmit output power and the actual generated transmitted power. Outside the dashed lines the actual transmit power level 440 tends to just level off even if the corresponding digital data number increases. The non-linear increasing in transmit power level 440 is due to the transmitter saturating.

The transmitter-receiver device has the non linear echo detector and transmit power level controller cooperate to compensate for the presence of the echo from the non-linear element by decreasing the maximum transmission power by a preset value to place the entire range of the transmit power level into the linear portion of the input/output operating characteristics of the transmitter-receiver device.

Figure 5A:
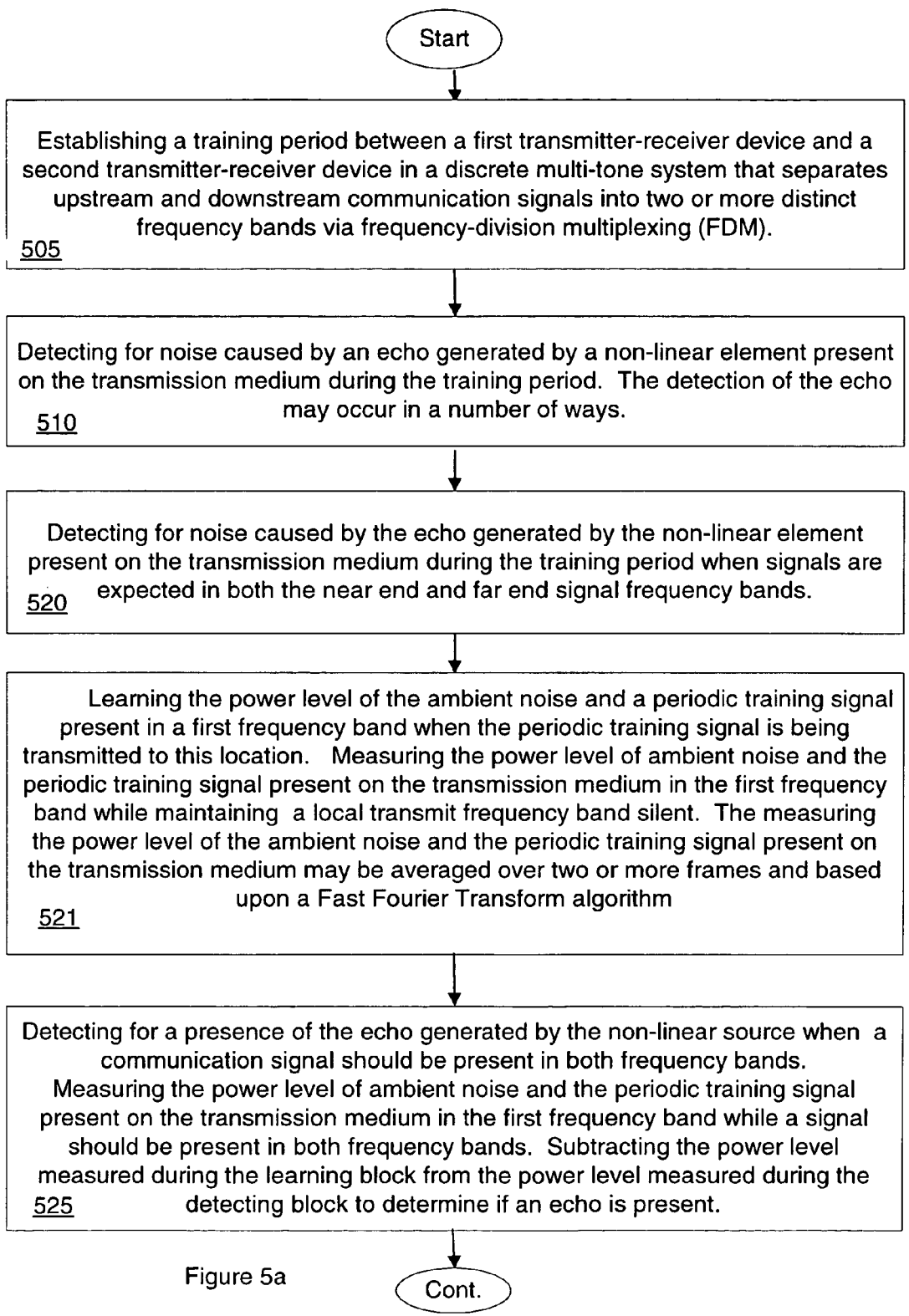
FIGS. 5a and 5b illustrate a flow chart of an embodiment of a discrete multiple tone system detecting for and reducing and/or eliminating an echo generated by a non-linear element.
Figure 5B:
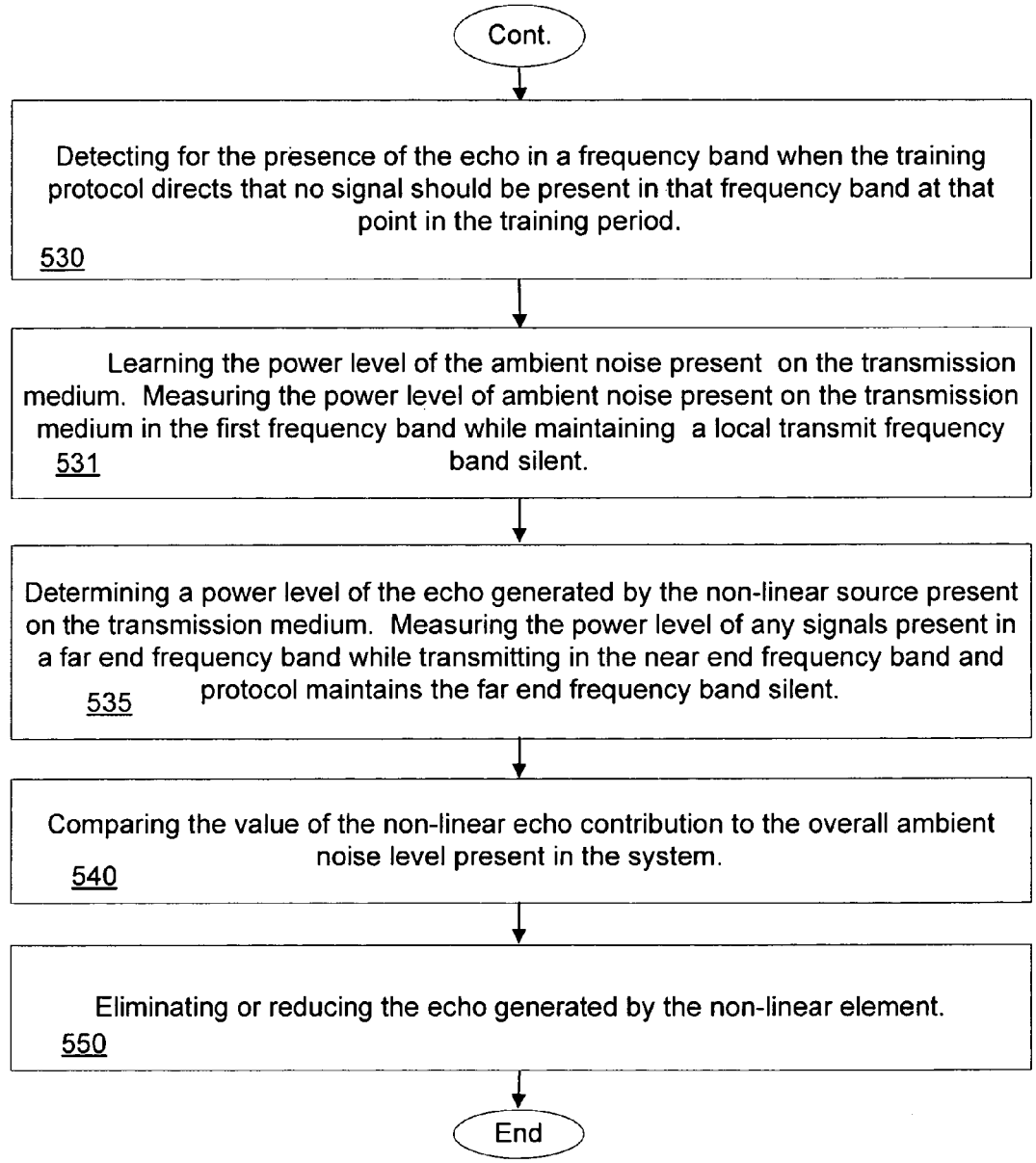

FIGS. 5a and 5b illustrate a flow chart of an embodiment of a discrete multiple tone system detecting for and eliminating an echo generated by a non-linear element.

In block 505, a training period between a first transmitter-receiver device and a second transmitter-receiver device in the discrete multiple tone system may be established that separates upstream signals and down stream communication signals into two or more separate frequency bands, i.e., far-end and near-end signals, via frequency-division multiplexing (FDM).

In block 510, the transmitter-receiver devices may detect for echo generated by a non-linear element present on the transmission medium during the training period. The non-linear echo may be caused by a saturation of a transmitted signal, the presence of non-linear element being directly connected to the transmission medium rather then coupling through an impedance matching filter to the transmission medium, or other source causing harmonics on the transmission medium. The detection of the echo may occur in a number of ways. A few examples will be given below.

In block 520, the transmitter-receiver devices may detect for echo generated by a non-linear element present on the transmission medium when signals are expected in both the near end and the far end frequency spectrums. The transmitter-receiver devices may both be transmitting signals at the time of the detection. The transmitter-receiver devices may transmit a periodic signal in the training period that mimics the expected bandwidth and amplitude of the actual data carrying signals such as a Reverb signal.

In block 521, the local transmitter-receiver device may first learn the power level of the ambient noise level and the transmitted periodic signal when the far end transmitter of the connection, (i.e. a transmitter from a remote location to this transmitter-receiver's location) is transmitting the periodic training signal. In an embodiment, the local transmitter-receiver device learns the power of the ambient noise and the transmitted periodic training signal from the far end by the following steps.

The local transmitter-receiver device keeps its transmitter silent and measures the signal power and the noise power of the periodic training signal at its receiver input. The measurement of the signal power of the periodic training signal and the noise power may be as follows:

For N number of successive frames of data:
a. For each frame n, take the Fast Fourier Transform of the received frame to obtain the signal component on each subcarrier $S_n(f)$. Where f represents the frequency of a particular subcarrier/tone. Note, by taking the FFT both the amplitude of the time domain and frequency domain components can be correlated for each discrete tone in the multiple tone periodic signal.
b. Average the FFT result of each frame of data over a number of, such as two or more, frames:

$$S(f) = \frac{1}{N}\sum_{n=0}^{N-1} S_n(f)$$

This represents the received signal at each tone f with the effect of ambient noise attenuated by the factor N.
c. Average the power of the FFT result of each frame over a number of frames:

$$S^2(f) = \frac{1}{N}\sum_{n=0}^{N-1} |S_n(f)|^2$$

This represents the total power of the periodic signal and ambient noise.
d. Calculate the power of background noise by subtracting the expected/known signal power of the periodic training signal from the total power detected. Generally, during the training period, the training protocol dictates sequences of signals with known frequencies and signal power levels.

$$N^2(f)=S^2(f)-(S(f))^2$$

This represents the power of the ambient noise.

The local transmitter-receiver device has now learned both the power level of the ambient noise level and the power level of transmitted periodic signal with the ambient noise.

In block 525, the local transmitter-receiver device detects for the presence of non-linear echo when both transmitter-receiver devices are transmitting signals at the time in the training protocol. The detection for the presence of an echo generated by the non-linear source when the training protocol directs that a communication signal should be present in both frequency bands may be as follows:

The local transmitter-receiver device starts transmitting the periodic training signal on the near-end while the far-end still transmits a periodic training signal as well.

For M number of successive frames of data:
e. For each frame m, take the FFT of the received frame to obtain the signal component on each subcarrier $R_m(f)$.
f. Average the FFT over a number of frames:

$$R(f) = \frac{1}{M}\sum_{m=0}^{M-1} R_m(f)$$

This represents the average total power of the line signal (both far-end and echo of near-end) at each tone f with the effect of noise attenuated.
g. Calculate the echo of near-end by subtracting the average signal power measured for the combined power of the periodic signal and ambient noise stage from the average total power of the line signal.

$$E(f)=R(f)-S(f)$$

This represents the average total power of the echo present on the transmission medium.

Thus, transmitter-receiver device subtracts the power level measured during the learning block from the power level measured during the detecting block to determine if an echo is present.

In block 530, the transmitter-receiver devices may also detect for the presence of non-linear echo when the remote transmitter-receiver device is silent at the time in the training protocol. The transmitter-receiver devices detect for the presence of a first signal in a frequency band when the training protocol directs that no signal should be present in that frequency band at that point in the training period. For example, the harmonic of the signal in the first frequency band is present in the second frequency band when no signal should be present in the second frequency band. This test detects that echo caused by the non-linear source present on the transmission medium.

In block 531, the transmitter-receiver device may learn the power level of the ambient noise present on the transmission medium. The transmitter-receiver device may measure the power present on the transmission medium and sensed by its receiver. The local transmitter-receiver device keeps its transmitter silent and measures the signal power of the noise at its receiver input. The transmitter-receiver device may average this power over a number of frames.

In block 535, the local transmitter-receiver device detects for the presence of an echo from a non-linear source when the far end signal is silent at the time in the training protocol. The transmitter-receiver device transmits its near end signal. The transmitter-receiver device may measure the power present in the second frequency band, i.e. far end frequency band, on the transmission medium and sensed by its receiver. Thus, transmitter-receiver device measures the power level of any signals present in a far end frequency band while transmitting in the near end frequency band and protocol maintains the far end transmitter silent.

The power level of signal will be the ambient noise power level plus the power level of any echo present in that frequency band because the training protocol directs no signal should be present. The transmitter-receiver device may calculate the power level of the echo of near-end signal by subtracting the average signal power measured for the ambient noise stage above from the total power measured by its receiver when the near end signal is being transmitted. This resultant power represents the average total power of the echo present on the transmission medium.

In block 540, the transmitter-receiver device compares the significance of the non-linear echo contribution to the overall ambient noise level present in the system.

The transmitter-receiver device calculates the ratio of non-linear echo power to ambient noise power. Non-linear echo power is determined in both blocks 525 and 535 above. Ambient noise power determined in the blocks 521 and 531 above.

$$ENR = \sum_f \frac{E^2(f)}{N^2(f)}$$

This represents the ratio of non-linear echo power to ambient noise power present on the transmission medium.

In block 550, if the non-linear echo contribution to the overall ambient noise level present in the system is significant indicated by a threshold amount, then compensate for the presence of the echo from the non-linear source. The system eliminates, i.e. reduces to an insignificant level, the echo generated by the non-linear source. If significant, the non-linear echo may be reduced or eliminated by placing an isolating filter in between the non-linear element and the transmission medium. If significant, the non-linear echo may be reduced or eliminated by reducing transmit power of the transmitter-receiver device that is generating the echo. If the power of the non-linear echo is lower than the power of the background noise, then the echo may be considered eliminated.

If echo-to-noise ratio (ENR) is above a preset threshold and if transmission power on the near-end is above a preset minimum value, then decrease the transmission power by a preset value and go to block 510. In an embodiment, limited the number of measurement and power reduction cycles to, for example, two steps of power level reduction.

If the non-linear echo was due to transmit power level, then lower transmission power enough to prevent any considerable non-linear echo. Next, use this power throughout the data transmission period. The transmitter-receiver device has the transmit power level controller set the maximum transmit power level based on the results of the training.

The transmitter-receiver device can also help a phone company detect for the presence of a significant non-linear element directly connected to the transmission medium such as a phone connected directly to the phone line without going through a filter.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

For example, a machine-readable medium may be provided having one or more instructions stored thereon, which instructions may be used to program a computer system or other electronic device to perform the operations described. A machine-readable medium may include any mechanism for storing or transmitting information in a form (e.g., software or processing application) readable by a machine (e.g., a computer). The machine-readable medium may include, but is not limited to, magnetic storage media (e.g., a floppy diskette), optical storage media (e.g., CD-ROM, CD-RW, DVD, etc.), magneto-optical storage media, read only memory (ROM), random access memory (RAM), erasable programmable memory (e.g., EPROM and EEPROM), flash memory, electrical, optical, acoustical, or other forms of propagated signal (e.g. carrier waves, infrared signals, digital signals, etc.), or other types of media suitable for storing electronic instructions.

The instructions and operations also may be practiced in distributed computing environments where the machine-readable media is stored on and/or executed by more than one computer system. In addition, the information transferred between computer systems may either be pulled or pushed across the communication media connecting the computer systems.

In general, although exemplary frequencies and tones are used in the description above, other frequencies, tones, and combinations thereof may be applicable to or affected by certain embodiments of the present invention.

Furthermore, referring to FIG. 1, although the communication system 100 is described above in the context of an ADSL system, the communication system 100 is representative of alternative types of communication systems, such as wireless radio frequency (RF), that may employ multi-carrier communication schemes to communicate data from a transmitter to a receiver.

In an embodiment, the transmitter-receiver device may take advantage of an extremely low noise, high linearity ADSL Analog Front End (AFE) and digital echo canceller, providing excellent long loop and bridge tap performance.

Thus, the transmitter-receiver device may reduce the need for a technician visit and provides superior modem training capability, particularly for those customers at the edge of the DSL coverage area.

The transmitter-receiver device may utilize impulse noise compensation and non-linear echo compensation to increase reliability and performance in actual ADSL end user environments. The transmitter-receiver device may detect real-world conflicts such as dimmer switches, fluorescent lighting, AM radio interference, unfiltered devices connected to the ADSL line (alarm systems, water meters, and half ringers) and poor wiring. This extra step ensures a better user experience, reduces truck rolls, and reduces lengthy troubleshooting calls.

In an embodiment, the transmitter-receiver device may also be a set top box that combines television (Internet Protocol TV or Satellite) with broadband Internet to bring the best of the airwaves and the Internet to an end user's TV set. The multiple carrier communication channel may communicate a signal to a residential home. The home may have a home network such as an Ethernet. The home network may either use the multiple carrier communication signal directly or convert the data from the multiple carrier communication signal. The integrated Satellite and Digital Television Receiver, High-Definition Digital Video Recorder and Digital Media Server make this a powerful set top box. Multi-Room Entertainment Networking and compelling Broadband Media Services provide the easiest way for the entire family to enjoy the digital lifestyle.

IPTV, Satellite and Digital Television Receiver

MediaPortal is capable of receiving satellite and local off-air television programming in both high-definition (HD) and standard-definition (SD) formats. Multiple tuners coupled with the high-definition, high-capacity Digital Video Recorder allow you to watch and record up to 3 programs simultaneously. Enjoy the best picture and sound available through the HD video and Dolby® Digital 5.1 audio outputs.

High-Definition Digital Video Recorder (DVR)

MediaPortal records and stores up to 180 hours of SD programming, up to 25 hours of HD programming, or any combination of the two on its huge 250 GB hard disk drive. Watch live TV or select a show to record with a press of the remote. The DVR allows you to pause live TV for up to two hours. Trick-play features include 4-speed fast forward and reverse, skip back and forward, and slow-motion frame-by-frame and forward and reverse.

Digital Media Server

MediaPortal organizes and stores your entire personal digital media library on an internal hard drive. Browse and manage your digital music and photo collections using our intuitive remote-controlled user interface. The built-in DVD/CD drive lets you play, read and burn DVDs and CDs so you can easily add media to your library or take it with you for sharing or enjoying on the go. Because MediaPortal is connected to your home network, its built-in Web interface will let you listen to music and view your photos from any browser-enabled device in the home or you can enjoy your media remotely with Web Remote Access service.

Multi-Room Entertainment Networking

MediaPortal can support multiple televisions to distribute content throughout the home using our entertainment networking technology. Now you can watch recorded shows, order video-on-demand, listen to music, view photos, and even pause live TV in one room and resume watching in another. Expand your digital media library to include music and photos stored on any computer in the home using our media PC software.

Broadband Media Services

With your super-fast DSL connection you can conveniently and legally purchase and download movies and music with our on-demand media services—even purchase movie tickets. With the same simplicity, you can order prints of your favorite photos for yourself or send them to someone else. Share all of your digital memories with family and friends on your own personal Website. All of this can be done from the comfort of your sofa and with a press of your remote control.

Referring to FIGS. 5a and 5b, although the noise detection method 500 is shown in the form of a flow chart having separate blocks and arrows, the operations described in a single block do not necessarily constitute a process or function that is dependent on or independent of the other operations described in other blocks. Furthermore, the order in which the operations are described herein is merely illustrative, and not limiting, as to the order in which such operations may occur in alternate embodiments. For example, some of the operations described may occur in series, in parallel, or in an alternating and/or iterative manner. Another approach is also possible. For example, the training protocol may start the periodic training signal at a lower power level than the expected data signal power level. The periodic training signal then may be progressively increase in power level while the local receiver detects for the presence of an echo. When the echo is detected, then the power level controller sets the power level of the transmitter to the power level immediately below the current power level that generated the saturation and resultant echo.

While some specific embodiments of the invention have been shown the invention is not to be limited to these embodiments. The invention is to be understood as not limited by the specific embodiments described herein, but only by scope of the appended claims.

What is claimed is:

1. A method, comprising:
   establishing a training period between a first transmitter-receiver device and a second transmitter-receiver device in a discrete multiple tone system that separates communication signals into two or more distinct frequency bands;
   detecting for an echo generated by a non-linear element present on a transmission medium during the training period;
   comparing relative noise contribution between the echo and ambient noise present on the transmission medium; and
   eliminating a noise contribution from the echo if the relative noise contribution is higher than a threshold value.

2. The method of claim 1, further comprising:
   eliminating the echo generated by the non-linear element by reducing transmit power of the transmitter-receiver device that is generating the echo.

3. The method of claim 1, further comprising:
   eliminating the echo generated by the non-linear element by placing an isolating filter in between the non-linear element and the transmission medium.

4. The method of claim 1, wherein the eliminating comprises compensating for the presence of the echo generated by the non-linear element.

5. The method of claim 1, further comprising:
   detecting for the echo generated by the non-linear elements present on the transmission medium during the training period when communication signals are expected in at least a first and a second frequency band.

6. The method of claim 1, further comprising:
   learning a power level of ambient noise and a periodic training signal present in a first frequency band when the periodic training signal is being transmitted to this location; and
   measuring the power level of ambient noise and the periodic training signal present on the transmission medium in a first frequency band while maintaining a local transmit communication signal utilizing a second frequency band silent.

7. The method of claim 6, wherein the measuring the power level of ambient noise and the periodic training signal present on the transmission medium is averaged over two or more frames and based upon a Fast Fourier Transform algorithm.

8. The method of claim 6, further comprising:
   determining a power level of the echo generated by the non-linear element on the transmission medium when the training protocol directs that a communication signal should be present in both frequency bands.

9. A machine readable medium storing instructions to cause the machine to perform the following operations, comprising:
   establishing a training period between a first transmitter-receiver device and a second transmitter-receiver device in a discrete multiple tone system that separates communication signals into two or more distinct frequency bands;
   detecting for noise caused by an echo generated by a non-linear element present on a transmission medium during the training period;
   comparing relative noise contribution between the echo and ambient noise present on the transmission medium; and eliminating a noise contribution from the echo if the relative noise contribution is higher than a threshold value.

10. The article of manufacture of claim 9, wherein the eliminating comprises, placing an isolating filter in between the non-linear element and the transmission medium.

11. The article of manufacture of claim 9, wherein the eliminating comprises reducing transmit power of the transmitter-receiver device that is generating the echo.

12. The article of manufacture of claim 9 containing further instructions to cause the further operations, comprising:
detecting for a presence of the echo in one of the frequency bands when a training protocol directs that no signal should be present in that frequency band at that point in the training period.

13. The article of manufacture of claim 9 containing further instructions to cause the further operations, comprising:
learning a power level of ambient noise present on the transmission medium while maintaining a local transmit communication signal utilizing a first frequency band silent; and
measuring the power level of any signals present in a second frequency band while transmitting in the first frequency band and maintaining the second frequency band silent.

14. The article of manufacture of claim 13 containing further instructions to cause the further operations, comprising:
determining a power level of the echo generated by the non-linear element on the transmission medium when the training protocol directs that no signal should be present in the second frequency band at that point in the training period.

15. The article of manufacture of claim 9 containing further instructions to cause the further operations, comprising:
setting a maximum transmit power level based on results from the training period.

16. An apparatus, comprising:
means for establishing a training period between a first transmitter-receiver device and a second transmitter-receiver device in a discrete multiple tone system that separates communication signals into two or more distinct frequency bands;
means for detecting for noise caused by an echo generated by a non-linear noise source present on a transmission medium during the training period;
means for comparing relative noise contribution between the echo and ambient noise present on the transmission medium; and
means for eliminating a noise contribution from the echo if the relative noise contribution is higher than a threshold value.

17. The apparatus of claim 16, further comprising:
means for detecting for echo on the transmission medium during the training period when communication signals are expected in at least a first frequency band and a second frequency band.

18. The apparatus of claim 16, further comprising:
means for detecting for a presence of a first signal in one of the frequency bands when a training protocol directs that no signal should be present in that frequency band at that point in the training period.

19. An apparatus, comprising:
a transmitter-receiver device, wherein the receiver portion contains a frequency filter and a non-linear echo detector to detect for the presence of an echo generated by a non-linear element, wherein the receiver portion compares relative noise contribution between the echo and ambient noise present on a transmission medium, and wherein the transmitter portion eliminates a noise contribution from the echo if the relative noise contribution is higher than a threshold amount.

20. The apparatus of claim 19, wherein the transmitter portion contains a transmit power level controller and the non-linear echo detector cooperates with the transmit power level controller to eliminate the echo by reducing transmit power of the transmitter-receiver device based on the relative noise contribution.

21. The apparatus of claim 19, wherein the non linear echo detector measures a power level of ambient noise and a periodic training signal present on a transmission medium based on an algorithm employing a Fast Fourier Transform and averages the measurements over two or more frames data.

* * * * *